US005741880A

United States Patent [19]

Valpey, III et al.

[11] Patent Number: 5,741,880
[45] Date of Patent: Apr. 21, 1998

[54] CLEARCOATING COMPOSITIONS

[75] Inventors: Richard S. Valpey, III, Frankfort, Ill.; Eugene L Bzowej, Chicago, Ill.

[73] Assignee: The Sherwin-Williams Company, Cleveland, Ohio

[21] Appl. No.: 845,841

[22] Filed: Apr. 28, 1997

Related U.S. Application Data

[60] Provisional application No. 60/017,531, May 10, 1996.

[51] Int. Cl.$^6$ .................. C08G 18/62; C08G 18/42; C08F 12/08; C08F 20/18; C08F 20/20; C08F 20/28; C07C 69/54; C07C 69/52

[52] U.S. Cl. .............. 528/74; 252/182.2; 252/182.24; 252/182.28; 427/385.5; 427/393.5; 427/407.1; 428/423.1; 525/123; 525/130; 526/280; 526/281; 526/282; 526/309; 526/320; 526/346; 526/347; 528/75; 528/80; 528/81; 560/205; 560/220; 560/224; 568/816; 568/820

[58] Field of Search ............... 252/182.2, 182.24, 252/182.28; 427/385.5, 393.5, 407.1; 428/423.1; 525/123, 130; 526/280, 281, 282, 309, 320, 346, 347; 528/74, 75, 80, 81; 560/205, 220, 224; 568/816, 820

[56] References Cited

U.S. PATENT DOCUMENTS

| | | | |
|---|---|---|---|
| 4,618,659 | 10/1986 | Kania et al. | 525/455 |
| 4,946,744 | 8/1990 | Shalati et al. | 428/500 |
| 5,157,100 | 10/1992 | Babjak et al. | 528/73 |
| 5,279,862 | 1/1994 | Corcoran et al. | 427/407.1 |
| 5,286,782 | 2/1994 | Lamb et al. | 524/507 |
| 5,288,807 | 2/1994 | Hinz | 525/279 |
| 5,314,953 | 5/1994 | Corcoran et al. | 525/123 |

*Primary Examiner*—Rabon Sergent
*Attorney, Agent, or Firm*—Robert E. McDonald; Heidi A. Boehlefeld; Vivien Y. Tsang

[57] ABSTRACT

A hydroxy-functional polymer having a number average molecular weight, as determined by gel permeation chromatography, of from about 1800 to about 2700 and which consists essentially of polymerized monomers of 10-40% by weight, based on the total weight of the polymer, styrene; 20-55% by weight isobornyl methacrylate; and 20-55% by weight hydroxypropyl methacrylate; where the total of the monomers equals 100% are disclosed. The polymers are especially useful in combination with polyisocyanates as clearcoats in clearcoat/basecoat coating applications.

13 Claims, No Drawings

CLEARCOATING COMPOSITIONS

This application claims the benefit of U.S. Provisional Application Number 60/017,531, filed May 10, 1996.

BACKGROUND OF THE INVENTION

1. Field of the Invention.

This invention relates to novel hydroxy-functional polymers and their use in combination with polyisocyanates to form clearcoating compositions which can be spray applied at relatively low VOC (volatile organic content) levels. The clearcoatings can be applied directly to substrates or, preferably, they can be used in combination with colored basecoats to produce clearcoat/basecoat compositions which are well-known as finishes for automobiles and trucks.

2. Description of the Prior Art

Hydroxy-functional polymers which can be utilized in clearcoat compositions are known in the art. Representative examples include those taught in U.S. patents, U.S. Pat. Nos. 5,314,953, 5,286,782, 5,279,862, 5,157,100 and 4,946,744.

BRIEF SUMMARY OF THE INVENTION

Clearcoat/basecoat finishes for original equipment application or for refinish application are very popular, and typically involve the application of a clearcoat to a colored basecoat in a wet-on-wet application, wherein the clearcoat is applied before the colored basecoat is completely cured, and both of the finishes are allowed to cure at the same time.

It is especially desirable in these finishes that the clearcoat reach a tack-free state of cure in a relatively short period of time so that the vehicle being painted can be moved without having dust or dirt stick to the clearcoat. In a typical refinishing operation, after the colorcoat and clearcoats have been applied, the resulting finish must be allowed to dry before the vehicle can be moved, and the finish must be sufficiently cured in order to present the adherence of dust, and to allow for buffing, if desired, to improve the gloss or to remove minor imperfections. In order to obtain faster tack-free times, one approach has involved the use of relatively higher molecular weight polymers, but this has the drawback of producing higher viscosity coatings which must be reduced with higher mounts of solvents in order to obtain useful spraying viscosities. The clearcoatings of this invention incorporate hydroxy-functional polymers of relatively low molecular weight which permit application at relatively low amounts of VOCs while still obtaining short cure times and excellent gloss and performance properties upon cure. High gloss of the cured clearcoat is an especially preferred characteristic and the clearcoats of this invention provide extremely high 20° gloss readings.

The hydroxy-functional polymers of this invention have a number average molecular weight, as determined by gel permeation chromatography of from about 1800 to about 2700, preferably about 1900 to about 2400, and consist essentially of polymerized monomers of 10–40% by weight, based on the total weight of the polymer, styrene; 20–55% by weight isobornyl methacrylate; and 20–55% by weight hydroxypropyl methacrylate; where the total of the monomers equals 100%. The polymer is especially useful in a clear curable composition comprising (i) a polyisocyanate; (ii) the hydroxy-functional polymer; and (iii) at least one organic solvent. The curable composition is typically utilized as a two-component system wherein the hydroxy-functional polymer would comprise one package and the polyisocyanate would comprise a second package. The two packages can then be mixed together to provide the curable composition immediately prior to use.

In one preferred application, this invention also relates to coated substrates having a multi-layer decorative and/or protective coatings which comprises:

(a) a basecoat comprising a pigmented film-forming polymer; and (b) a transparent clearcoat applied to the surface of the basecoat composition;

wherein the clearcoat comprises the curable composition of this invention. The term "film-forming polymer" means any polymeric material that can form a film from evaporation of any carrier or solvent.

In its most preferred embodiment, the clear curable compositions of this invention will have a viscosity as determined by a number 2 Zahn Cup at 25° C. of less than about 30 seconds, and the organic solvent would be present at a level to provide a VOC of the clear curable composition of about 4.0 pounds per gallon or less.

Accordingly, one object of this invention is to provide a new hydroxy-functional polymer and curable compositions incorporating that polymer. Another object is to provide curable compositions especially useful as clearcoatings, having relatively low viscosity and yet which attain a tack-free and dust-free state shortly after being applied to a substrate. A further object of this invention is to provide coatings having excellent reactivity, durability, cure and UV resistance. A further object of this invention is to provide improved coating compositions which can be cured at room temperature or force dried at elevated temperatures typically up to about 300° F. It is also an object of this invention to provide curable compositions which provide high gloss upon cure. Another object is to provide improved clearcoat basecoat finish systems. These and other objects of the invention will be apparent from the following discussions.

DETAILED DESCRIPTION OF THE INVENTION

The clear curable compositions of this invention comprise (i) a polyisocyanate; and (ii) a hydroxy-functional polymer having a number average molecular weight as determined by gel permeation chromatography of from about 1800 to about 2700, and which consists essentially of polymerized monomers of 10–40% by weight, based on the total weight of the polymer, styrene; 20–55% by weight isobornyl methacrylate; and 20–55% by weight hydroxypropyl methacrylate; wherein the total of the monomers equals 100%; and (iii) at least one organic solvent.

The hydroxy-functional polymer can be conveniently prepared by conventional, free-radical additional polymerization techniques. Typically, the polymerization would be conducted in an inert solvent in the presence of a suitable initiator, such as a peroctoate, azo or peracid compound, at temperatures ranging from about 75° C. to about 200° C., preferably about 120°–160° C. Especially preferred initiators include t-butyl peroctoate and t-amyl peroctoate. The initiator would typically be present at a level of at least 3%, and preferably about 4–8% of the total combined weight of the hydroxypropyl methacrylate, styrene and isobornyl methacrylate monomers. The reaction mixture typically will be chased several times after the addition of all of the monomers by the addition of a suitable free radical initiator such as a peroxide or peroctoate material in order to ensure complete reaction. Di t-butyl peroxide and t-butyl peroctoate are especially preferred for this.

The polymers of this invention will typically have a relatively high glass transition temperature (Tg) of 50° C. or higher, and with the selection of the specified monomer composition and molecular weight, these polymers in combination with polyisocyanates will provide curable compositions having excellent dust-free times and tack-free times, as well as excellent gloss and durability upon cure.

Polyisocyanates useful in this invention are those having two or more isocyanate groups per molecule. Representative polyisocyanates include aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanatomethyl-3,5, 5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenylmethane-4,4',4"-triisocyanate, 1,3,5-triisocyanate benzene and 2,4,6-triisocyanate toluene; and the tetraisocyanates such as 4,4'-diphenyl-dimethyl methane-2,2'-5,5'-tetraisocyanate; the polymerized polyisocyanates such as tolylene diisocyanate dimers and trimers, and other various polyisocyanates containing biuret, urethane, isocyanurate and/or allophanate linkages. Aliphatic polyisocyanates are especially preferred. The polyisocyanate will typically be present at a level to provide an NCO/active hydrogen ratio of from about 0.7/1 to about 1.4/1.

Useful organic solvents for the curable composition include those materials which typically would not be reactive with the polyisocyanate and would representatively include esters, ketones and ethers.

The curable compositions of this invention can be cured at temperatures from about room temperature up to about 300° F. or higher. The coatings will typically also contain other additives such as flow agents, catalysts, such as tertiary amines or tin compounds to catalyze the isocyanate reaction, ultraviolet light absorbers or stabilizers, and may optionally contain diluents including reactive diluents such as low molecular weight polyols if desired. The curable compositions may typically be applied to any substrate such as metal, plastic, wood, glass, synthetic fibers, etc. by brushing, dipping, roll coating, flow coating, spraying or other methods conventionally employed in the coating industry. When utilized as a clearcoat in a clearcoat/basecoat composition, the curable compositions will typically be spray applied.

Clearcoat/basecoat systems are well known, especially in the automobile industry where it is especially useful to apply a pigmented basecoat, which may contain metallic pigments, to a substrate followed by the application of a clearcoat which will not mix with or have any appreciable solvent attack upon the previously applied basecoat. Typically, at least some of the solvent will be allowed to evaporate from the basecoat prior to the application of the clearcoat. In some applications the basecoat may even be allowed to cure, at least partially, prior to application of the clearcoat. The basecoat composition may comprise any of the polymers known to be useful in coating compositions including the reactive compositions of this invention.

One useful polymer basecoat includes the acrylic addition polymers, particularly polymers or copolymers of one or more alkyl esters of acrylic acid or methacrylic acid, optionally together with one or more other ethylenically unsaturated monomers. These polymers may be of either the thermoplastic type or the thermosetting, crosslinking type with contain hydroxyl or amine or other reactive functionality which can be crosslinked. Suitable acrylic esters for either type of polymer include methyl methacrylate, ethyl methacrylate, propyl methacrylate, butyl methacrylate, ethyl acrylate, butyl acrylate, vinyl acetate, acrylonitrile, acrylamide, etc. Where the polymers are required to be of the crosslinking type, suitable functional monomers which can be used in addition to those already mentioned include acrylic or methacrylic acid, hydroxy ethyl acrylate, 2-hydroxyl propyl methacrylate, glycidyl acrylate, tertiary-butyl amino ethyl methacrylate, etc. The basecoat composition may, in such a case, also contain a crosslinking agent such as a carbodiimide, a polyanhydride, a polyisocyanate, a polyepoxide, or a nitrogen resin such as a condensate of an aldehyde such as formaldehyde with a nitrogenous compound such as urea, melamine or benzoguanamine or a lower alkyl ether of such a condensate. Other polymers useful in the basecoat composition include vinyl copolymers such as copolymers of vinyl esters of inorganic or organic acids, such as vinyl chloride, vinyl acetate, vinyl propionate, etc., which copolymers may optionally be partially hydrolyzed so as to introduce vinyl alcohol units.

Other polymers useful in the manufacture of the basecoat include alkyd resins or polyesters which can be prepared in a known manner by the condensation of polyhydric alcohols and polycarboxylic acids, with or without the inclusion of natural drying oil fatty acids as described elsewhere in this specification. The polyesters or alkyds may contain a proportion of free hydroxyl and/or carboxyl groups which are available for reaction, if desired with suitable crosslinking agents as discussed above.

If desired, the basecoat composition may also contain waxes, rheology modifiers, cellulose esters, or the additives to alter the appearance, drying or viscosity characteristics of the basecoat.

Typically, the basecoat will include pigments conventionally used for coating compositions and after being applied to a substrate, which may or may not previously have been primed or sealed, the basecoat will normally be allowed sufficient time to form a wet polymer film which will not be lifted during the application of the clearcoat. The clearcoat is then applied to the surface of the basecoat, and the system can be allowed to dry or, if desired, can be force dried by baking the coated substrate at temperatures typically ranging up to about 300° F.

Typically, the clearcoat may contain ultraviolet light absorbers or stabilizers, such as hindered phenols or hindered amines at a level ranging up to about 6% by weight of the vehicle solids as is well known in the art. The clearcoat can be applied by any application method known in the art, but preferably will be spray applied. If desired, multiple layers of basecoat and/or clearcoat can be applied. Typically, both the basecoat and the clearcoat will each be applied to give a dry film thickness of about 0.01 to about 6.0, and especially about 0.5 to about 3.0, mils. If a primer or sealer is applied to the substrate prior to application of the basecoat, it will typically be applied to give a dry-film thickness of about 0.3 to about 5.0, and especially about 2.0 to 3.0 mils. One suitable primer-sealer is ULTRA FILL II® E6H59, commercially available from The Sherwin-Williams Company.

The following examples have been selected to illustrate specific embodiments and practices of advantage to a more complete understanding of the invention.

RESIN EXAMPLE 1

A hydroxy-functional acrylic polymer was prepared by charging a reaction vessel, equipped with a nitrogen purge, reflux condenser, stirrer and an addition line, with 600 parts methyl amyl ketone which was heated to approximately 147° C. A monomer mixture of 931.2 parts hydroxy propyl methacrylate, 600 parts styrene, 868.8 parts t-butyl methacrylate and 144 parts t-butyl peroctoate (commercially available from Akzo Chemical, Inc.) was gradually charged to the heated solvent over a period of approximately three hours to the reaction mixture. After the addition was completed, the reaction mixture was maintained at a temperature of approximately 147° C. for 30 minutes. The reaction was chased three times with 0.96 parts di-t-butyl peroxide with a 30-minute hold after each addition to complete the reaction. The reaction mixture was then reduced by the addition of 600 parts n-butyl acetate. The resultant polymer had a density of 8.346 pounds per gallon, an NVM (percent by weight non-volatile material) of 64.4%, a Tg of 64° C., a number average molecular weight of approximately 2100, a weight average molecular weight of 4400, a Z average molecular weight of approximately 6900 and a polydispersity of approximately 2.1.

RESIN EXAMPLE 2

In like manner to Resin Example 1, a hydroxy-functional acrylic polymer was prepared utilizing the same process and parts by weight of raw materials set forth in Example 1, except that the 868.8 parts of t-butyl methacrylate of Example 1 was replaced with 868.8 parts of isobornyl methacrylate. The resultant resin exhibited a density of 8.433 pounds per gallon, an NVM of 66%, a Tg of 72° C., a number average molecular weight of approximately 2000, a weight average molecular weight of approximately 4100, a Z average molecular weight of approximately 6500 and a polydispersity of 2.1.

RESIN EXAMPLE 3

A reaction vessel equipped as set forth in Resin Example 1 was charged with 600 parts methyl amyl ketone and heated to approximately 148° C. A monomer mixture of 840 parts hydroxy ethyl methacrylate, 600 parts styrene, 960 parts t-butyl methacrylate and 144 parts t-butyl peroctoate was gradually charged to the heated solvent over a period of approximately three hours. The reaction mixture was then held at 148° C. for 30 minutes. The reaction was then chased three times with 0.8 parts di-t-butyl peroxide with a 30-minute hold after each addition of the peroxide. The reaction mixture was then allowed to cool to approximately 126° C. and was reduced by the addition of 600 pans n-butyl acetate. The hydroxy-functional acrylic polymer had a density of 8.394 pounds per gallon, an NVM of 65%, a number average molecular weight of approximately 2200, a weight average molecular weight of approximately 4800, a Z average molecular weight of approximately 7600 and a polydispersity of 2.2.

RESIN EXAMPLE 4

The process of Resin Example 3 was repeated exactly, except that the 960 parts of t-butyl methacrylate was replaced with 960 parts isobornyl methacrylate. The final polymer exhibited a density of 8.501 pounds per gallon, an NVM of 66.8%, a number average molecular weight of 2100, a weight average molecular weight of 4400, a Z average molecular weight of approximately 7000 and a polydispersity of 2.1.

CLEARCOATING EXAMPLES A–D

The performance of resins 1–4 was compared by preparing clearcoatings according to the formulation set forth below:

|  | Clearcoating Example A | Clearcoating Example B | Clearcoating Example C | Clearcoating Example D |
|---|---|---|---|---|
| Polymer of Example 1 | 576.09 | — | — | — |
| Polymer of Example 2 | — | 562.12 | — | — |
| Polymer of Example 3 | — | — | 570.77 | — |
| Polymer of Example 4 | — | — | — | 555.39 |
| 2% Solution of Dibutyl Tin Dilaurate | 5.56 | 5.56 | 2.70 | 2.70 |
| Byk ® 300[1] | 5.25 | 5.25 | 5.25 | 5.25 |
| Tinuvin ® 123[2] | 8.28 | 8.28 | 8.28 | 8.28 |
| Tinuvin ® 384[3] | 16.56 | 16.56 | 16.56 | 16.56 |
| Ethyl Ethoxy Propionate | 200.00 | 200.00 | 200.00 | 200.00 |
| n-butyl Acetate | 123.36 | 133.78 | 129.34 | 139.55 |

[1]Silicone resin solution produced by Byk-Mallinckrodt
[2]Hindered amine light stabilizer produced by Ciba-Geigy
[3]UV absorber produced by Ciba-Geigy Each of the clearcoatings A, B, C and D were individually admixed with 181 parts Tolonate HDT®100 LV (isocyanurate trimer of hexamethylene diisocyanate commercially available from Rhone-Poulenc, Inc.) and reduced to approximately 22 seconds on a number 2 Zahn cup with methyl isobutyl ketone and sprayed onto steel panels which had been previously coated with ULTRA® F5B 149 black basecoat (commercially available from The Sherwin-Williams Company). The level of isocyanate added to each individual clearcoating provides a 1/1 NCO/OH ratio. The sprayed panels were tested to determine out-of-dust time and tack-free time after spraying. Each of the panels was also tested to determine the 20° gloss reading after three days of air drying at room temperature. The test results are set forth in the table below:

|  | Clearcoating Example A | Clearcoating Example B | Clearcoating Example C | Clearcoating Example D |
|---|---|---|---|---|
| VOC as Sprayed | 4.14 | 4.07 | 4.21 | 4.11 |
| Out-of-Dust Time[4] | 40 | 30 | 63 | 55 |
| Tack-Free Time[5] | 205 | 190 | 185 | 180 |
| 20° Gloss[6] | 85 | 89 | 85 | 90 |

[4]In minutes after spraying as determined by placing filtered primer surfacer dust on the panel which was allowed to set for five minutes and then wiped off. The coating is considered to be cured to an "out-of-dust" state when the dust does not adhere and can be wiped off the surface without leaving a mark.
[5]As measured in minutes from spraying by using a Sutro 250 tack tester with a 10 g weight.
[6]After 3 days air dry.

As shown in the table, the hydroxypropyl methacrylate gives much faster out-of-dust times and the isobornyl methacrylate provides higher 20° gloss. Although it is not our intent to be bound by theory, it appears that due to the predominantly secondary hydroxyls of the HPMA compared to the HEMA, higher catalyst levels can be utilized without significantly affecting pot-life or other properties.

In order to determine critical values of molecular weight, a series of resins having different molecular weights was selected and compared in comparable clearcoating formulas. The general composition used to manufacture the resins (25% styrene, 36.2% isobornyl methacrylate, and 38.8% hydroxypropyl methacrylate prepared in general as shown in Example 1) and the resin characteristics are set forth below:

ronmental regulations, obtaining a sprayable viscosity at VOC's of 4.0 pounds per gallon is particularly preferred. Each of the clearcoating examples 5–8 showed a sprayable viscosity of approximately 21 seconds on a number 2-Zahn Cup at the specified VOC. Optimization of solvent blends

|  | Resin Example 5 | Resin Example 6 | Resin Example 7 | Resin Example 8 |
| --- | --- | --- | --- | --- |
| Styrene | 600.0 | 600.0 | 600.0 | 600.0 |
| Isobornyl Methacrylate | 868.8 | 868.8 | 868.8 | 868.8 |
| Hydroxypropyl Methacrylate | 931.2 | 931.2 | 931.2 | 931.2 |
| Methyl Amyl Ketone | 643.2 | 672.0 | 717.75 | 600.0 |
| t-butyl peroctoate | 144.0 | 144.0 | 144.0 | 144.0 |
| di-t-butyl peroxide | 0.96 × 3 | 0.96 × 3 | 0.975 × 3 | 0.96 × 3 |
| Butyl Acetate | 482.4 | 528.0 | 483.75 | 600.0 |
| Mn/Mw/Mz[7] | 1779/3425/5448 | 2144/3920/6077 | 2400/4700/2700 | 2750/6100/10100 |
| Pd | 1.93 | 1.83 | 1.9 | 2.2 |
| Out of Dust Time | 55.0 | 35.0 | 30.0 | 30.0 |
| 20° Gloss[8] | 89.0 | 89.1 | 89.2 | 89.0 |
| VOC as Sprayed | 4.09 | 4.14 | 4.14 | 4.8 |

[7]Mn/Mw/Mz based on polystyrene standard using gel permeation chromatography.
[8]After one day air dry.

The test results for out-of-dust time (in minutes) and 20° gloss were obtained by preparing a paint composition incorporating each of the resin examples as set forth below:

| Paint Formulation (Parts by Weight) | |
| --- | --- |
| Resin | 265.34 |
| 2% Solution of Dibutyltin Dilaurate | 2.77 |
| Tinuvin 123 | 4.12 |
| Tinuvin 384 | 8.24 |
| n-butyl acetate | 71.78 |
| Methyl Isobutylketone | 15.39 |
| Byk 306 Flow Agent | 4.90 |
| Acrylic Polymer A620A2[9] | 2.82 |
| Ethyl 2-ethoxy Propionate | 93.567 |
| Tolonate HDT100LV | 94.36 |

[9]Polybutyl acrylate flow agent from Cook Paint and Varnish Company.

The clearcoating was prepared for each of Resin Examples 5–7 according to the paint formulation shown above. The clearcoating for Resin Example 8 was prepared according to the same paint formula, except that Byk 300 (from Byk Mallinckrodt) was used as the flow agent in place of the Byk 306 and the A620A2. The clearcoatings were admixed with the polyisocyanate and sprayed onto steel panels which had already been coated with ULTRA® F5B149 black basecoat.

As shown, the out-of-dust time improves significantly, and would generally be acceptable when the number average molecular weight is a minimum of at least about 1800 as measured by gel permeation chromatography. Additionally, number average molecular weights of approximately 2750 or higher make it very difficult to obtain sprayable viscosities at the preferred VOC's of approximately 4. As such, a preferred molecular weight range to obtain the excellent out of dust times and relatively low VOC's is from about 1800 to about 2700. An especially preferred range of number average molecular weight to obtain an excellent balance of properties is from about 1900 to about 2400. Due to envi- ronmental regulations, obtaining a sprayable viscosity at VOC's of 4.0 pounds per gallon is particularly preferred. Each of the clearcoating examples 5–8 showed a sprayable viscosity of approximately 21 seconds on a number 2-Zahn Cup at the specified VOC. Optimization of solvent blends will generally permit the application of clearcoatings based on the preferred resin composition at number average molecular weights between about 1800 and 2400 at approximately 4.0 VOC. One preferred clearcoating composition comprising the resin of this invention and which is sprayable at approximately 4.0 VOC is representatively set forth below:

| Preferred Paint Formulation (Parts by Weight) | |
| --- | --- |
| Resin | 277.10 |
| 2% Solution of Dibutyltin Dilaurate | 0.09 |
| Byk 300 | 2.72 |
| Acrylic Polymer A620A2 | 0.54 |
| Tinuvin 123 | 2.72 |
| Tinuvin 384 | 8.17 |
| Methyl Isobutylketone | 53.37 |
| Diacetone Alcohol | 6.01 |
| N-butyl Acetate | 13.73 |

This clear composition would have a VOC of approximately 3.73 pounds per gallon. It would be typically admixed with a solvent solution of an isocyanate material such as the following representative formula:

| Raw Material | Parts by Weight |
| --- | --- |
| Tolonate HDT100LV | 89.09 |
| N-butyl Acetate | 25.00 |
| Exxate 700[10] | 59.36 |
| Exxate 800[11] | 9.82 |
| DBE-9[12] | 4.15 |

[10]Exxate 700 is a trademark of Exxon Chemical Company for a mixture of heptyl acetates.
[11]Exxate 800 is a trademark of Exxon Chemical Company for a mixture of octyl acetates.
[12]Solvent blend primarily of dimethyl glutarate and dimethyl succinate commercially available from DuPont Chemicals.

This solvent solution of a polyisocyanate would have a volatile organic content of approximately 4.38 pounds per gallon. When the solvent solution of the polyisocyanate is admixed with the representative clear coating formulation to provide an NCO/OH ratio of 1/1, the resulting sprayable clear composition would have a VOC of approximately 4.0 and would give excellent out-of-dust times, 20° gloss performance, and would provide a durable, cured clear film which is resistant to ultraviolet light degradation.

Unless otherwise indicated, as used herein the term "parts" means parts by weight and "percent" is percent by weight. Molecular weights were determined by gel permeation chromatography using a polystyrene standard. Glass transition temperatures were determined by differential scanning calorimetry. While this invention has been described by a specific number of embodiments, other variations and modifications may be made without departing from the spirit and scope of the invention as set forth in the appended claims. The entire disclosure of all applications, patents and publications cited herein are hereby incorporated by reference.

The invention claimed is:

1. A hydroxy-functional polymer having a number average molecular weight, as determined by gel permeation chromatography, of from about 1800 to about 2700 and which consists essentially of polymerized monomers of 10–40% by weight, based on the total weight of the polymer, styrene; 20–55% by weight isobornyl methacrylate; and 20–55% by weight hydroxypropyl methacrylate; where the total of the monomers equals 100%.

2. The hydroxy-functional polymer of claim 1 wherein the number average molecular weight is from about 1900 to about 2400.

3. A clear curable composition comprising:

(i) a polyisocyanate; and (ii) a hydroxy-functional polymer having a number average molecular weight as determined by gel permeation chromatography of from about 1800 to about 2700 and which consists essentially of polymerized monomers of 10–40% by weight, based on the total weight of the polymer, styrene; 20–55% by weight isobornyl methacrylate; and 20–55% by weight hydroxypropyl methacrylate; where the total of the monomers equals 100%; and (iii) at least one organic solvent.

4. The clear curable composition of claim 3, wherein the clear curable composition has a viscosity as determined by a Number 2 Zahn Cup at 25° C. of less than about 30 seconds, and wherein the organic solvent is present at a level to provide a VOC of the clear curable composition of about 4.0 pounds per gallon or less.

5. The clear curable composition of claim 3 wherein the hydroxy-functional polymer has a number average molecular weight of from about 1900 to about 2400.

6. The curable composition of claim 3 wherein the polyisocyanate is an aliphatic polyisocyanate.

7. A substrate coated with a dried and cured layer of the composition of claim 3.

8. In a substrate coated with a multi-layer decorative and/or protective coating which comprises:

(a) a basecoat comprising a pigmented film-forming polymer; and (b) a transparent clearcoat comprising a film-forming polymer applied to the surface of the basecoat composition;

the improvement which comprises utilizing as the clearcoat a multi-component curable composition which comprises:

(i) a polyisocyanate; and (ii) a hydroxy-functional polymer having a number average molecular weight as determined by gel permeation chromatography of from about 1800 to about 2700 and which consists essentially of polymerized monomers of 10–40% by weight, based on the total weight of the polymer, styrene; 20–55% by weight isobornyl methacrylate; and 20–55% by weight hydroxypropyl methacrylate; where the total of the monomers equals 100%; and (iii) at least one organic solvent.

9. The substrate of claim 8 wherein the clearcoat has a viscosity as determined by a Number 2 Zahn Cup at 25° C. of less than about 30 seconds, and wherein the organic solvent is present at a level to provide a VOC of the clear curable composition of about 4.0 pounds per gallon or less.

10. The substrate of claim 8 wherein the hydroxy-functional polymer has a number average molecular weight of from about 1900 to about 2400.

11. The substrate of claim 8 wherein the polyisocyanate is an aliphatic polyisocyanate.

12. An improved process for applying a clearcoat/colored basecoat composition to a substrate which process comprises the steps of applying a colored basecoat to a substrate, applying a clearcoat over the colored basecoat, and curing the colored basecoat and the clearcoat to form a dried, cured clearcoat/basecoat finish; wherein the improvement comprises utilizing as the clearcoat a multi-component curable composition which comprises:

(i) a polyisocyanate; and (ii) a hydroxy-functional polymer having a number average molecular weight as determined by gel permeation chromatography of from about 1800 to about 2700 and which consists essentially of polymerized monomers of 10–40% by weight, based on the total weight of the polymer, styrene; 20–55% by weight isobornyl methacrylate; and 20–55% by weight hydroxypropyl methacrylate; where the total of the monomers equals 100%; and (iii) at least one organic solvent.

13. The process of claim 12 wherein the hydroxy-functional polymer has a number average molecular weight of about 1900 to about 2400.

* * * * *